United States Patent
Melvin (10) Patent No.: US 9,614,895 B2
(45) Date of Patent: Apr. 4, 2017

(54) FILE TRANSFER USING XML

(75) Inventor: Jonathan Melvin, Aughton (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 291 days.

(21) Appl. No.: 14/374,834

(22) PCT Filed: Apr. 25, 2012

(86) PCT No.: PCT/US2012/034943
§ 371 (c)(1),
(2), (4) Date: Jul. 25, 2014

(87) PCT Pub. No.: WO2013/162542
PCT Pub. Date: Oct. 31, 2013

(65) Prior Publication Data
US 2015/0052220 A1    Feb. 19, 2015

(51) Int. Cl.
*G06F 15/16* (2006.01)
*H04L 29/08* (2006.01)
(Continued)

(52) U.S. Cl.
CPC ........ *H04L 67/06* (2013.01); *G06F 17/30076* (2013.01); *H04L 41/0246* (2013.01); *H04L 67/2823* (2013.01); *H04L 67/02* (2013.01)

(58) Field of Classification Search
CPC ...... H04L 41/0246; H04L 67/00–67/02; H04L 41/0273
See application file for complete search history.

(56) References Cited

U.S. PATENT DOCUMENTS 6,167,045 A * 12/2000 Pirovano ............. H04N 7/1675
348/E5.108
7,571,465 B2    8/2009 Ikeda
(Continued)

FOREIGN PATENT DOCUMENTS

CN    1761256    4/2006
CN    1835452    9/2006
(Continued)

OTHER PUBLICATIONS

Bilorusets, Ruslan, et al. "Web services reliable messaging protocol (WS-ReliableMessaging)." Specification, BEA, IBM, Microsoft and TIBCO, http://xml.coverpages.org/WS-ReliableMessaging200502.pdf (2005).*
(Continued)

*Primary Examiner* — Brendan Higa
(74) *Attorney, Agent, or Firm* — Dierker & Associates, P.C.

(57) ABSTRACT

A tangible, machine readable storage medium stores instructions and implements a method when the instructions are executed by a processor. A source file is received by a gateway engine. The source file is a binary file. The source file is portioned into multiple parts by a breakdown engine. The multiple parts are transferred by a reliable transfer engine using a single port according to a messaging protocol to transfer messages reliably between nodes in the presence of any of software failures, component failures, system failures, or network failures. The multiple parts are reassembled into a copy of the source file by a reassembly engine.

15 Claims, 7 Drawing Sheets

(51) Int. Cl.
*H04L 12/24* (2006.01)
*G06F 17/30* (2006.01)

(56) References Cited

U.S. PATENT DOCUMENTS

| | | | |
|---|---|---|---|
| 7,827,195 B2 | 11/2010 | Uematsu et al. | |
| 7,853,676 B1 | 12/2010 | Freskos et al. | |
| 2002/0143855 A1* | 10/2002 | Traversat | G06F 9/4416 709/202 |
| 2005/0149626 A1 | 7/2005 | Manchester et al. | |
| 2006/0007957 A1 | 1/2006 | Pihlajamaki | |
| 2006/0056403 A1* | 3/2006 | Pleasant | G06F 1/14 370/389 |
| 2007/0076228 A1* | 4/2007 | Apelbaum | G06Q 10/10 358/1.1 |
| 2007/0115917 A1 | 5/2007 | Miller et al. | |
| 2007/0143464 A1* | 6/2007 | Ooba | H04L 29/12254 709/223 |
| 2008/0109532 A1* | 5/2008 | Denoual | H04L 12/58 709/219 |
| 2008/0209572 A1 | 8/2008 | Kano et al. | |
| 2009/0193431 A1* | 7/2009 | Beard | G06F 9/546 719/314 |
| 2009/0307229 A1 | 12/2009 | Kunti et al. | |
| 2010/0287247 A1* | 11/2010 | Kohring | G06F 21/606 709/206 |
| 2010/0332677 A1 | 12/2010 | Tian | |

FOREIGN PATENT DOCUMENTS

| | | |
|---|---|---|
| EP | 1918824 | 5/2008 |
| JP | 2004287978 A | 10/2004 |

OTHER PUBLICATIONS

PCT Search Report/Written Opinion ~ Application No. PCT/US2012/034943 dated Jan. 2, 2013 ~ 10 pages.
EPO; European Extended Search Report; EP Application 12875444.7;PCT/US2012/034943; Mailed Nov. 24 2015; 8 pages.
Lam et al; A Web Service Framework Supporting Multimedia Streaming; IEEE Transactions on Services Computing, vol. 6, No. 3, Jul.-Sep. 2013.
Ling, Luo; Research on Streaming Media Courseware Making System Base on XML; Thesis—Master Dissertation of Chongqing University; College of Computer Science, Chongqing University; May 2005.
Peng, Liu; Research on Quality of Service for Web Services; Thesis—Degree of Master Engineering; Computer Science and Technology; Graduate School of National University of Defense Technology, Changsh, Hunan, P.R.China; Mar. 2008.
Research and Application of Heterogeneous Data Integration Based on SOA; Jun. 2011.

* cited by examiner

FILE TRANSFER USING XML

BACKGROUND

File transfers allow for distributed computing by making files available for remote access and communication. XML web service standards may be used for internal and external communications. Some file transfer systems require multiple ports for communication of messages, and are incompatible with modern XML standards and infrastructures.

BRIEF DESCRIPTION OF THE DRAWINGS

Features and advantages of examples of the present disclosure will become apparent by reference to the following detailed description and drawings, in which like reference numerals or characters correspond to similar, though perhaps not identical, components. For the sake of brevity, reference numerals, characters, or features having a previously described function may or may not be described in connection with other drawings in which they appear.

DETAILED DESCRIPTION

The present disclosure relates generally to systems for transferring files, and to methods of managing file transfers.

Data transfer has been supported by using file transfer technologies such as File Transfer Protocol (FTP) or Protocole d'Echanges pour un Systéme Interbancaire de Télécompensation (PeSIT). However, FTP, PeSIT, and other file transfer technologies may use multiple ports and require specialized hardware to manage routing and load balancing. Further, there are issues with FTP in active and passive modes that require special communications over multiple ports. For example, a client contacts a server to identify the port for connection and the server communicates back over that port. Further, establishing new FTP channels can be complex and/or costly. Additionally, some systems are incompatible with security standards such as Identity Federation and do not support Single Sign-On (SSO). Enterprise computing systems may require security technology including firewalls to manage threats. Enterprise systems may use firewalls to block web-channels.

Disclosed herein are examples of a system, method and machine readable medium for transferring files. Examples according to the present disclosure provide for a file transfer service using standards that enable a fault tolerant file transfer over a single port on a web-type connection.

Examples of the present disclosure include file transfers of any type and may be used within any type of environment. Representative environments in which examples of the present disclosure may be implemented include file transfers from individual to individual, business to business, business to government, government to government, etc. Examples according to the present disclosure provide for a file transfer protocol allowing files to be transferred reliably between nodes in the presence of software failures, component failures, system failures, and/or network failures. The file transfer protocol includes, for example, a web services reliable messaging platform which defines a Simple Object Access Protocol (SOAP) binding to support interoperable web services.

Examples of the present disclosure enable a file transfer using XML-based technology. This file transfer is also called XFTP herein. XFTP is compatible with Security Assertion Markup Language (SAML)/ws-federation to support authentication and authorization. XFTP is also compatible with Secure Sockets Layer (SSL)/Transport Layer Security (TLS) and XML security standards for encryption and digital signatures. This allows secure file transfers with non-repudiation. These features render XFTP suitable for Service Oriented Architectures (SOAs) and cloud based environments, as well as for business to business data transfer scenarios.

In an example, XFTP uses the same Web 2.0 standards upon which current cloud infrastructures are based, allowing system integration that may not be possible with FTP or other legacy standards.

Some enterprises may invest in infrastructure such as enterprise service buses and security devices. Examples according to the present disclosure allow for interoperability with such infrastructure, including XML security gateways, allowing for existing investments to be reused. In an example, the XFTP file transfer protocol as disclosed herein works with standard hardware load balancers and routers. For example, XFTP works with XML Security Gateways such as IBM DataPower. XFTP supports development of SOAs and works over a single port.

Figure 1:
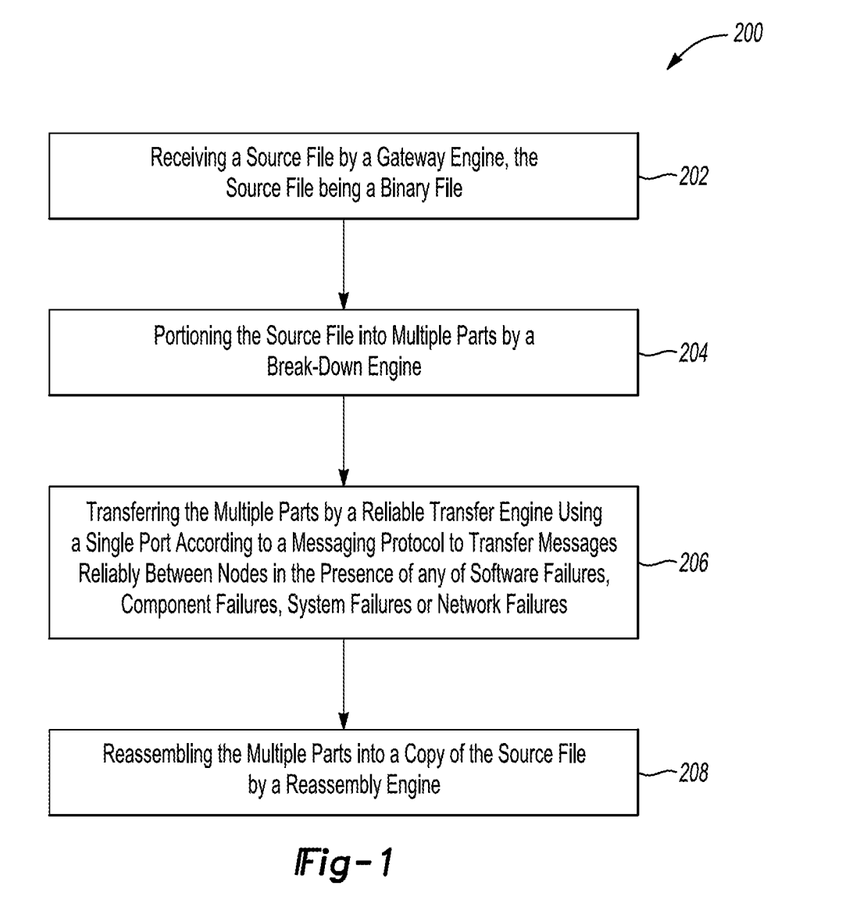
FIG. 1 is a flow diagram depicting an example of a method according to the present disclosure.

Referring now to FIG. 1, an example of the file transfer method is generally depicted at reference numeral 200. The method includes receiving a source file by a gateway engine, as shown at reference numeral 202. The source file is a binary file. As shown at reference numeral 204, the method further includes portioning the source file into multiple parts by a breakdown engine. The multiple parts are transferred by a reliable transfer engine using a single port according to a messaging protocol to transfer messages reliably between nodes in the presence of any of software failures, component failures, system failures, or network failures, as shown at reference numeral 206. It is to be understood that the transfer of the multiple parts may be optimized according to a particular message optimization protocol, for example, in instances when such a protocol is supported by a communication channel utilized. As depicted at reference numeral 208, the multiple parts are reassembled into a copy of the source file by a reassembly engine. It is to be understood that various examples of the method shown in FIG. 1 will be further described in reference to the other figures.

Figure 2:
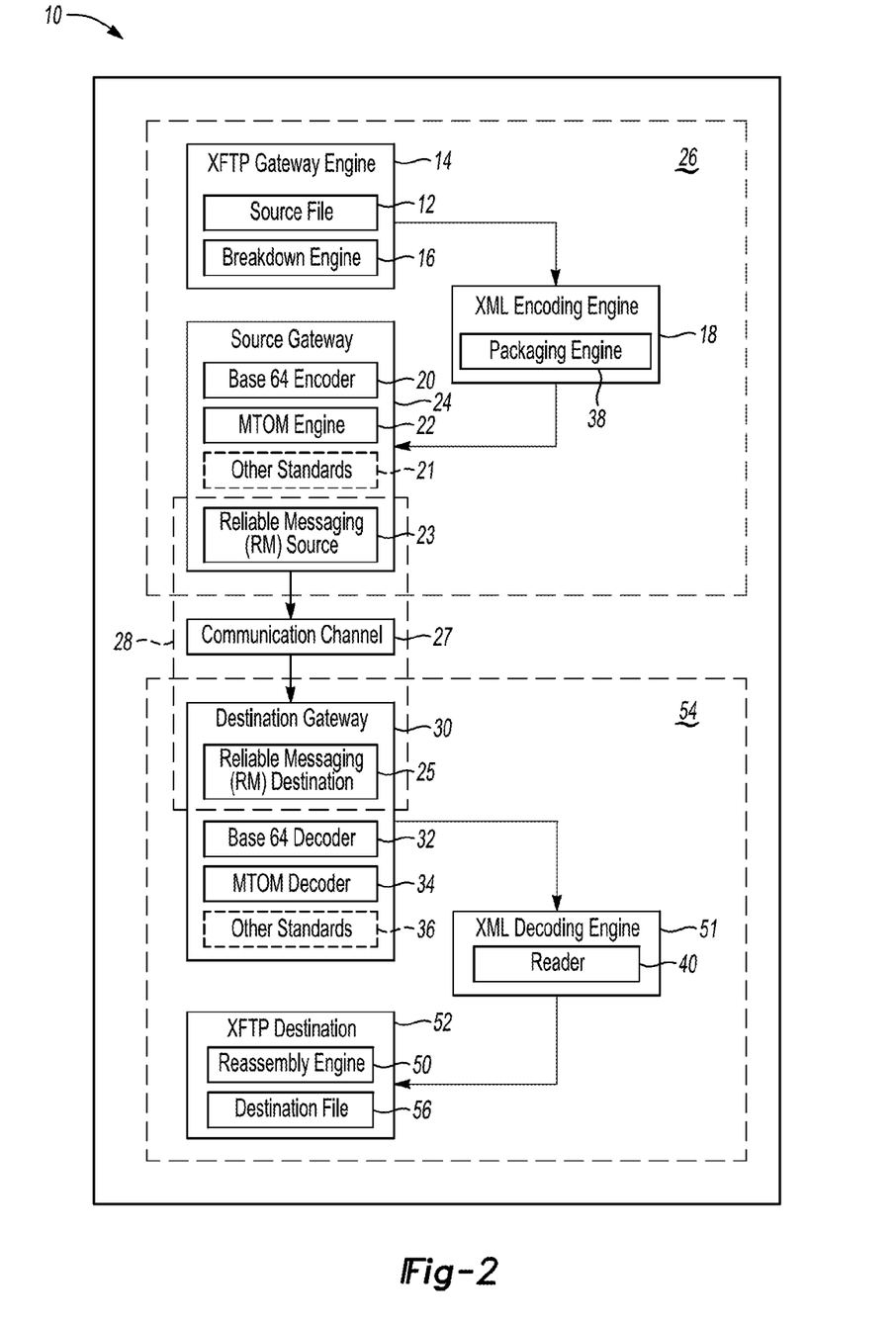
FIG. 2 is a schematic illustration of an example file transfer system according to the present disclosure.

An example of a system for accomplishing XFTP according to the present disclosure is depicted generally at 10 in FIG. 2. It is to be understood that throughout the description of FIG. 2, FIGS. 3, 4A and/or 4B may be referenced.

Figure 3:
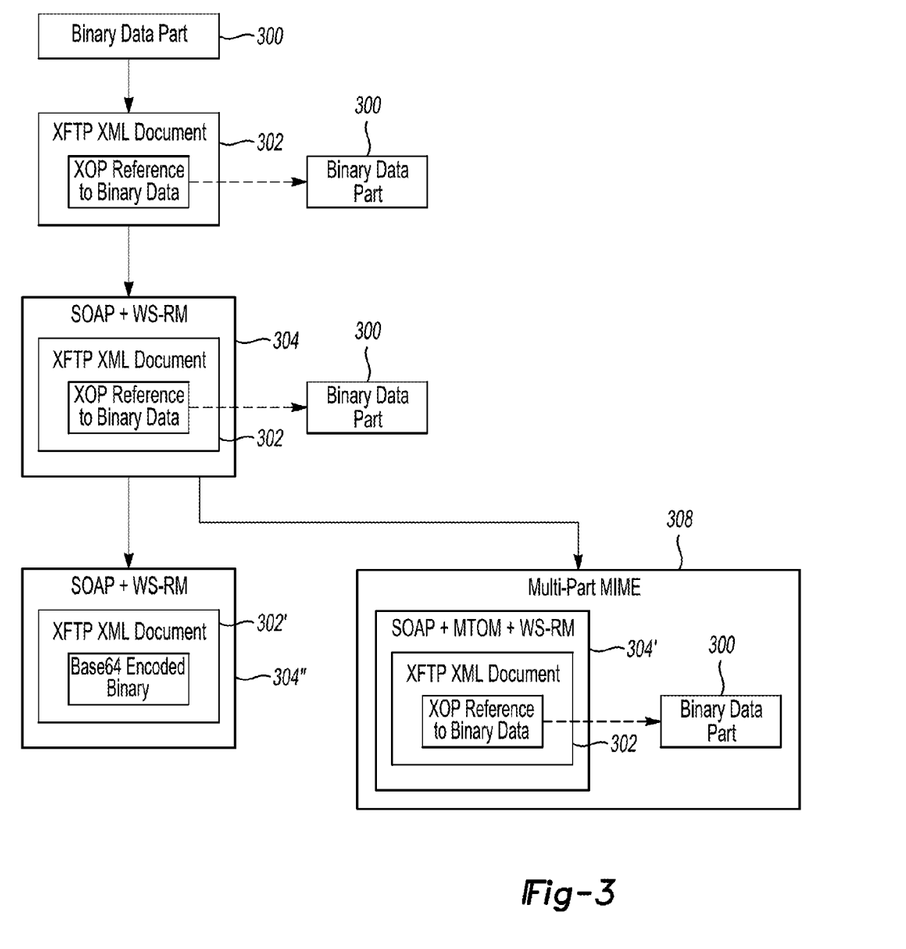
FIG. 3 is a flow diagram depicting an example of two methods for encoding binary data parts for subsequent transfer.
Figure 4A:
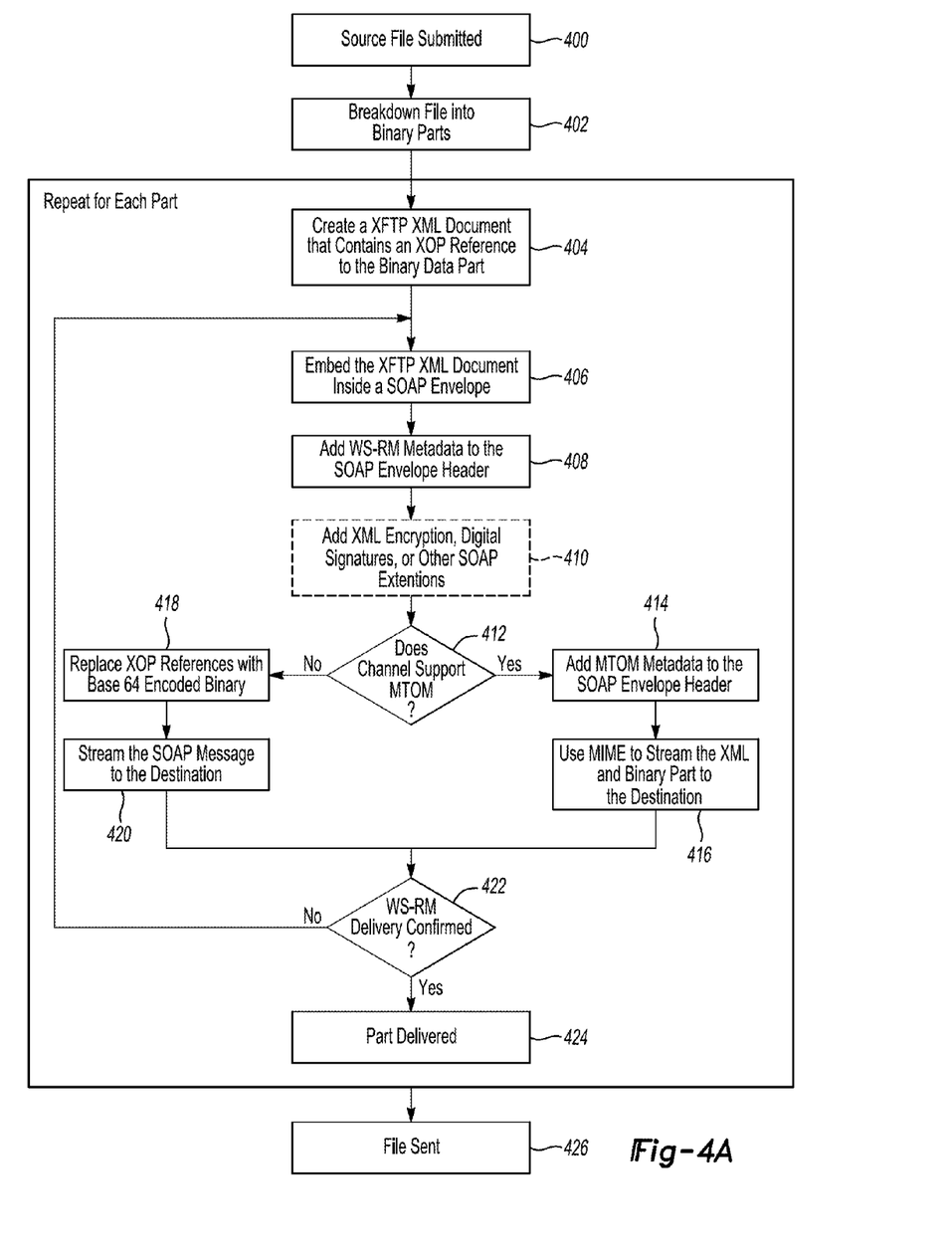
FIG. 4A is a flow diagram depicting an example of a method for preparing a source file for transfer as multiple parts.

Referring now to FIGS. 2, 3 and 4A, system 10 includes a gateway engine 14 which is capable of receiving a source file 12 (as shown at reference numeral 400 of FIG. 4A). The source file 12 is a binary file. The gateway engine 14 includes a breakdown engine 16 that is capable of portioning or parsing the source file 12 into multiple binary parts (as shown at reference numeral 402 of FIG. 4A). As such, the breakdown engine 16 provides for a disassembly of the source binary file 12. A single binary part is shown at reference numeral 300 in FIG. 3. Each of the multiple binary parts 300 includes binary data. It is to be understood that the binary parts 300 need not be persisted/stored as individual files, but rather may simply exist in memory or be read directly from the source file 12 as needed. Further, it is to be understood that the binary parts 300 may be referred to generally as chunks, sections, pieces, or portions.

In an example, the source file 12 gets broken down into parts 300 which can be effectively transferred and later reassembled. This enables large files to be transferred in a reliable manner. The size of the parts 300 may be determined by requirements of a communication channel 27 as used for the transfer process. For example, the dynamics of the communication channel 27 may limit the maximum size of any single data transfer, or there may be a message size at which the channel 27 operates at peak efficiency.

As used herein, the communication channel 27 may refer to a port (which may be a physical or virtual connection) upon which data is transferred. In an example, the XFTP may be used over any channel 27 that supports or is capable of supporting SOAP, such as hypertext transfer protocol (HTTP), simple mail transfer protocol (SMTP), message queues (MQ), or other like examples. In some instances, the channel 27 supports or is capable of supporting both SOAP and MTOM (discussed further hereinbelow).

System 10 further includes an XML Encoding engine 18 which is capable of encoding the binary parts 300 in XML. The XML Encoding engine 18 includes a packaging engine 38 that is used to create an XML document (see reference numeral 302 in FIG. 3) for each of the multiple parts 300. In an example, the packaging engine 38 is an XOP engine that uses XOP standard(s) to XML encode each binary part 300. In an example using the XOP standard(s), the packaging/XOP engine 38 creates the XML document 302 containing an XOP reference to the binary data part 300 in its raw form. In FIG. 4A, the creation of the XML document 302 is shown at reference numeral 404. XML-binary Optimized Packaging (XOP) is a mechanism defined for the optimized serialization of XML information sets that contain binary data as developed by contributors to the W3C standards setting organization. An XML information set is defined according to W3C as a well-formed document satisfying certain constraints. Message Transmission Optimization Mechanism (MTOM) is the W3C message transmission optimization mechanism that involves the efficient transmission of binary data to and from Web services. In an example disclosed herein, MTOM uses XOP as the optimization and referencing mechanism.

The system 10 further includes a source gateway 24, which is capable of receiving the XML document 302 and the referenced binary data part 300 from the XML encoding engine 18. As shown in FIG. 3, the source gateway 24, via a source gateway engine (not shown), embeds the XML document 302 within a SOAP message 304. A Reliable Messaging (RM) source 23 (discussed further hereinbelow) of the source gateway 24 implements a messaging protocol (e.g., WS-ReliableMessaging protocol) and uses this protocol to transfer all of the XML documents 302 (i.e., from the original source file 12) as a complete and ordered message sequence. WS-ReliableMessaging is a protocol developed by the Organization for the Advancement of Structured Information Standards (OASIS) for message transfers. WS-ReliableMessaging may be used for reliability (unlike, e.g., often unreliable TCP connections), and may be applied across any channel 27. As shown in FIG. 4A, embedding the XML document 302 within the SOAP message 304 and implementing the messaging protocol may involve first embedding the XML document 302 inside a SOAP envelope, as shown at reference numeral 406, and then adding messaging protocol metadata to a header of the SOAP envelope, as shown at reference numeral 408.

As shown in FIG. 2, the source gateway 24 may also include another standards engine 21. The other standards engine 21 allows the source gateway 24 to support other XML, WS, and/or SOAP standards to enhance the communications. The other standards engine 21 may also be used to add an additional security protocol layer to each of the SOAP messages 304. For example, WS-ReliableMessaging provides for extensibility under the model of SOAP and Web Services Description Language (WSDL). Security protocol layers include XML-Signature or other digital signatures, XML-Encryption, other SOAP extensions, Transport Layer Security (TLS) Encryption, Mutual Authentication, Federation, etc. XML or other digital signatures to validate to a recipient that the file has come from the correct source. SAML and ws-federation may be used to establish trust between the sender and receiver, and SAML may also be used to established authorization to send the message sequence. The addition of XML encryption, digital signatures or other SOAP extensions to the SOAP messages 304 is shown at reference numeral 410 of FIG. 4A.

As shown in FIG. 2, the source gateway 24 may include two encoders, one of which is a Base 64 encoder 20, and the other of which is an MTOM engine 22. As shown at reference numeral 412 of FIG. 4A, the source gateway 24 determines whether the communication channel 27 to be used for message transmission supports MTOM.

When the channel 27 does support MTOM, the MTOM engine 22 of the source gateway 24 allows the XML SOAP message 304 and XOP referenced binary data part 300 to be streamed to a destination (e.g., a destination gateway 30) as (or in) a container, such as a multi-part MIME (shown at reference numeral 308 in FIG. 3). As shown at reference numerals 414 and 426 of FIG. 4A, the MTOM engine 22 may add MTOM metadata to the header of the SOAP envelope to generate SOAP message 304' (FIG. 3), and the MIME 308 may be used to stream the SOAP message 304' (including XML document 302) and the binary data part 300 to the destination. The use of MTOM may advantageously avoid an increase in the volume of data to be transferred.

A communication channel 27 may be capable of supporting SOAP but may not be capable of supporting a mechanism for transferring raw binary data. In these instances, MTOM/XOP cannot be used to optimize the communication, at least in part because the channel 27 does not support MTOM. When the channel 27 does not support MTOM, the Base 64 encoder 20 replaces the XOP reference in the XML document 302 with a Base 64 encoded representation of the binary data, as shown at reference numeral 418 of FIG. 4A. As shown in FIG. 3, this process generates a Base 64 encoded XML document 302' and a SOAP message 304" without attachments.

As shown in FIG. 2, it is to be understood that the XFTP gateway engine 14, the XML encoding engine 18, and the source gateway 24 may all be part of a single component, as shown at box 26. It is to be further understood that the XFTP gateway engine 14, the XML encoding engine 18, and the source gateway 24 may be any combination of two or more separate components. In an example, the source gateway 24 or components thereof may be an IBM DataPower XML security gateway, which supports WS-ReliableMessaging, and other security and/or optimization standards.

Referring now to FIGS. 2 and 4A, the SOAP message 304" without attachments or the multi-part MIME 308 is capable of being transferred from the source gateway 24 to the destination gateway 30 across the communication channel 27 and according to the messaging protocol (e.g., WS-ReliableMessaging). A transfer engine 28 (also referred to herein as a reliable transfer engine) includes the Reliable Messaging (RM) source 23 of the source gateway 24 and a Reliable Messaging (RM) destination 25 of the destination gateway 30. It is to be understood that as used in this context, "reliable" means capable of overcoming failures of software, components, systems, and/or networks. The reliable transfer may be accomplished according to the messaging protocol to transfer individual messages/packets (e.g., the SOAP message(s) 304" or the multi-part MIME(s) 308) reliably between nodes in the presence of any such failures. When using the reliable transfer engine 28, a single port may provide for transportation of the SOAP message 304" or the multi-part MIME 308 according to the messaging protocol. The reliable transfer engine 28 (including RM source 23 and RM destination 25) may include features having connectivity rules, delivery confirmation, ordering management, duplicate messaging protection, or a combination thereof.

Transfer engine 28 may enable the individual messages/packets to be received in the same order in which they were sent. This may be accomplished, for example, using the RM source 23 and the RM destination 25. In this example, the RM Source 23 is capable of assigning a message number to each message within a sequence (e.g., to each SOAP message(s) 304 generated for a single source file 12). The message number begins at 1 and increases by 1 for each subsequent message. The message numbers are assigned in the same order in which messages are sent. The RM Destination 25 includes AcknowledgementRange child element(s) that contain in their collective ranges the message number of every message accepted by the RM Destination 25. The RM Destination 25 excludes the message numbers of any messages not accepted in the Acknowledgement-Range elements. The RM Destination 25 is capable of sending the message numbers that are accepted in order to apprise the RM Source 23 of message delivery (see reference numerals 422-426 in FIG. 4A). The RM Destination 25 is also capable of returning "None" to the RM Source 23 instead of an AcknowledgementRange if no messages have been received by the RM Destination 25. The RM Source 23 may retransmit unacknowledged messages (i.e., any messages that the RM Destination 25 does not acknowledge receiving).

In an example, the messaging protocol (e.g., WS-ReliableMessaging) may be configured to determine an amount of time regarding how far to look back for messages. WS-ReliableMessaging can be configured to suit the dynamics of the channel 27 across which it is operating.

Figure 4B:
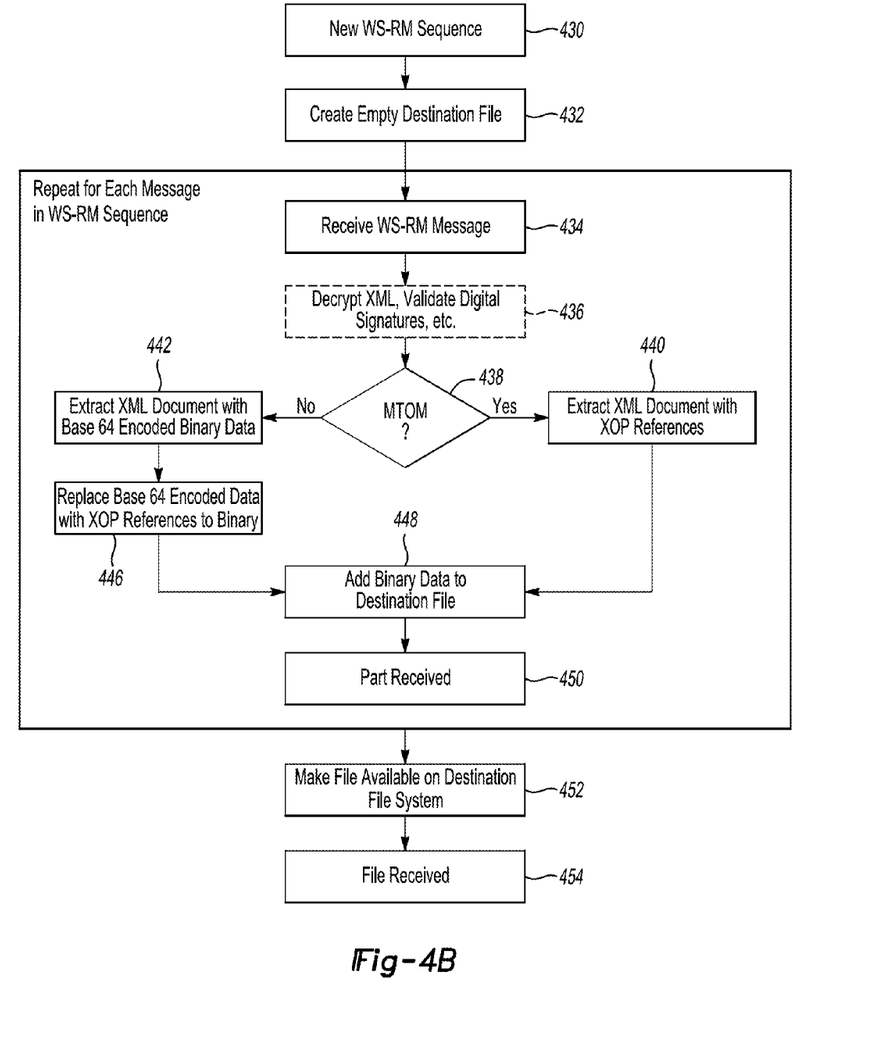
FIG. 4B is a flow diagram depicting an example of a method for generating a copy of a source file from multiple transferred parts.

As shown in FIG. 4A, steps at reference numerals 404 through 424 are repeated for each binary data part 300 portioned from the original source file 12. This example of the method then continues as shown in FIG. 4B. Referring now to FIGS. 2 and 4B together, all of the SOAP message(s) 304" or multi-part MIME(s) 308 generated for the single source file 12 (as described and shown in reference to FIGS. 2, 3 and 4A) are transmitted to the destination gateway 30, and thus a new message sequence is received, as shown at reference numeral 430 in FIG. 4B). The destination gateway 30 may create an empty destination file, as shown at reference numeral 432 of FIG. 4B, that will be used to create a copy of the original source file 12 (i.e., the destination file 56).

Each message within a sequence is processed individually, as shown at reference numerals 434 through 450 of FIG. 4B. The destination gateway 30 receives an individual SOAP message 304" or multi-part MIME 308 and utilizes another standards engine 36 to decrypt any additional XML, validate any digital signatures, or undo or remove any other SOAP extensions that had been included by other standards engine 21.

The destination gateway 30 then determines whether MTOM had been utilized, as shown at reference numeral 438 of FIG. 4B. In other words, the destination gateway 30 determines whether the message is a SOAP message 304" or a multi-part MIME 308. Depending upon the type of message, a different encoder 32 or 34 of the destination gateway 30 may be used to retrieve the XML document 302 with the XOP reference to binary data.

As shown in FIG. 2, the destination gateway 30 of the XFTP system 10 further includes two decoders, namely a Base 64 decoder 32 and an MTOM decoder 34. When the message sequence includes SOAP message(s) 304", the Base 64 decoder 32 converts the XML document 302' containing Base 64 encoded binary of the SOAP message(s) 304" to the XML document 302 with XOP references to binary data. As shown at reference numerals 442 and 446 of FIG. 4B, the Base 64 decoder 32 extracts the XML document 304" with Base 64 encoded binary data and then replaces the Base 64 encoded binary data with the XOP references to the binary data. When the message sequence includes multi-part MIME(s) 308, the MTOM decoder 34 is able to retrieve the XML document 302 with XOP references to binary data from the SOAP message 304'. As shown at reference numeral 440 of FIG. 4B, the MTOM decoder 34 directly extracts the XML document 302 with XOP references to binary data from the multi-part MIME(s) 308.

The XFTP system 10 further includes an XML decoding engine 51. The XML decoding engine 51 is capable of receiving the XML document 302 with XOP references to binary data from the destination gateway 30 and extracting the binary data from the XML document 302. In an example, the XML decoding engine 51 is capable of operating with a reader 40 (e.g., an XOP reader) to retrieve the binary data part, and to pass the binary data to an XFTP Destination 52.

The XFTP Destination 52 is capable of receiving the individual binary part 300 from the XML Decoding Engine 51. In an example, the XFTP Destination 52 is capable of operating with a reassembly engine 50 to reassemble all of the individual binary parts 300 into the empty destination file (as shown at reference numerals 448 and 450 of FIG. 4B) to create the destination file 56, which will be a copy of the source file 12. The reassembly engine 50 repackages/recomposites/reconstructs the decoded binary data of each of the messages/packets and strings them back together to form the copy (destination file 56) of the original source file 12. As such, the steps shown at reference numerals 434 through 450 of FIG. 4B are performed for each message in order to generate the destination file 56, which will be in the same format as the original source file 12.

Upon formation of the destination file 56, the XFTP destination 52 may make the destination file 56 accessible to a user of the system 10 (as shown at reference numerals 452 and 454 of FIG. 4B). The XFTP destination 52 may include a file system, from which the destination file 56 is retrievable or otherwise accessible.

In FIG. 2, it is to be understood that the components indicated by destination gateway 30, XML decoding engine 51, and XFTP destination 52 may be implemented in a single component, as shown at box 54, or may be any combination of individual components.

Figure 5:
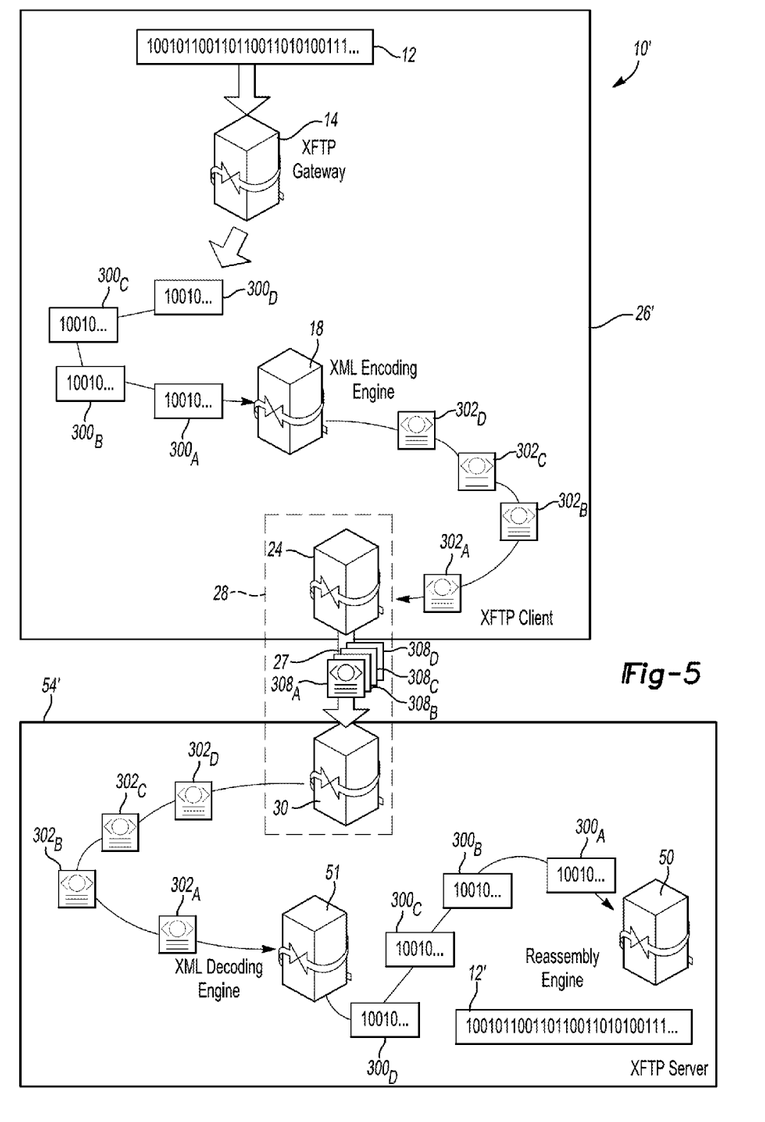
FIG. 5 is a schematic illustration of another example of the file transfer system according to the present disclosure.

Referring now to FIG. 5, another example of the system 10' is depicted. In this example, the original source file 12 is a binary file, as depicted by the sequence of 1's and 0's. In this example, the source file 12 is portioned and encoded at the XFTP client 26'. Also in this example, the encoded portions are received, decoded, and reassembled at the XFTP server 54'.

As shown in FIG. 5, the XFTP gateway 14 receives the source file 12 containing the binary data. While not shown, the breakdown engine 16 of the XFTP gateway 14 breaks the file 12 down into parts $300_A$, $300_B$, $300_C$, $300_D$, each of which contains some of the binary data from the original source file 12. The size of each part $300_A$, $300_B$, $300_C$, $300_D$ is configured to suit the dynamics, requirements, etc. of the communication channel 27 used for transfer of the parts $300_A$, $300_B$, $300_C$, $300_D$.

The parts $300_A$, $300_B$, $300_C$, $300_D$, are then processed by the XML encoding engine 18, which generates an XML document $302_A$, $302_B$, $302_C$, $302_D$ for each of the parts $300_A$, $300_B$, $300_C$, $300_D$. It is to be understood that each XML document $302_A$, $302_B$, $302_C$, $302_D$ includes an XOP reference to the corresponding binary data of the respective part $300_A$, $300_B$, $300_C$, $300_D$.

The XML documents $302_A$, $302_B$, $302_C$, $302_D$ (including respective XOP references) are transmitted to the source gateway 24 for additional processing, as described above in reference to FIGS. 2, 3 and 4A. In short, in the example of FIG. 5, the XML document $302_A$, $302_B$, $302_C$, $302_D$ including the XOP references to raw binary data are embedded into respective SOAP messages (304, not shown in FIG. 5) and are streamed as respective multi-part MIMEs $308_A$, $308_B$, $308_C$, $308_D$. In another example, the XML document $302_A$, $302_B$, $302_C$, $302_D$ including the XOP references to raw binary data may be embedded into respective SOAP messages (e.g., 304), and the references to raw binary data may be replaced with a Base 64 encoded representation of the binary data to create SOAP messages (e.g., 304") without attachments.

As shown in FIG. 5, the respective multi-part MIMEs $308_A$, $308_B$, $308_C$, $308_D$ are transmitted across the communication channel 27 and are received by the destination gateway 30.

Since the message sequence of FIG. 5 includes multi-part MIMEs $308_A$, $308_B$, $308_C$, $308_D$, the MTOM decoder 34 is able to retrieve the XML documents $302_A$, $302_B$, $302_C$, $302_D$ with XOP references to binary data from the respective SOAP messages (304', not shown in FIG. 5) of the multi-part MIMEs $308_A$, $308_B$, 308, $308_D$. It is to be understood that when the Base 64 encoder is utilized, the Base 64 decoder 32 may be used to retrieve the XML documents $302_A$, $302_B$, $302_C$, $302_D$ with XOP references to binary data.

The XML decoding engine 51 is capable of receiving the XML document $302_A$, $302_B$, $302_C$, $302_D$ with XOP references to binary data from the destination gateway 30. The XML decoding engine 51 extracts the binary data parts $300_A$, $300_B$, $300_C$, $300_D$ from the respective XML document $302_A$, $302_B$, $302_C$, $302_D$.

As shown in FIG. 5, the reassembly engine 50 receives the individual binary part $300_A$, $300_B$, $300_C$, $300_D$ and reassembles all of the individual binary parts $300_A$, $300_B$, $300_C$, $300_D$ to create a copy of the source file 12 (i.e., the destination file 56, not shown).

Figure 6:
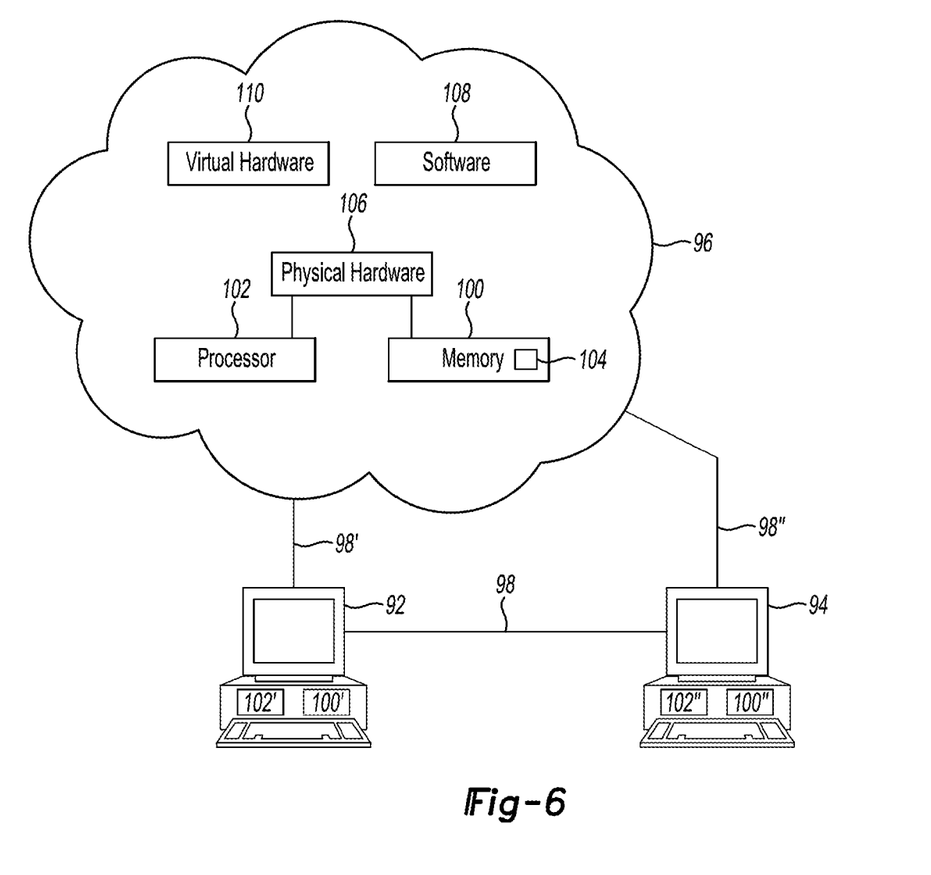
FIG. 6 is a semi-schematic view of an example of a file transfer program in a computing environment for an example file transfer as part of a local system, a remote system, and/or a cloud computing system according to the present disclosure.

In the foregoing discussion, various components have been described as engines which may include hardware, associated programming, or a combination thereof. These components may be implemented in a variety of fashions. FIG. 6 illustrates examples of implementation of these components as part of any of a local system, a remote system, and a cloud computing system. As illustrated in FIG. 6, a source computing system 92 may be operatively connected to a local or remote destination computing system 94 via a link 98, or to a cloud computing system 96 via a link 98', or to both systems 94, 96. Remote destination computing system 94 may be operatively connected to cloud computing system 96 via a link 98". It is to be understood that the local or remote destination computing system 94 may include one or more standalone computing systems 94 and/or a network of destination computing systems 94. The links 98, 98' may be one or more of cable, wireless, fiber optic, or remote connections via a telecommunication link, an infrared link, a radio frequency link, or any other connectors or systems that provide electronic communication. Links 98, 98' may include, at least in part, an intranet, the Internet, or a combination of both. The links 98, 98' may also include intermediate proxies, routers, switches, load balancers, and the like. It is to be understood that links 98, 98' are capable of providing communication channels for XFTP system 10 to operate.

Each of the source computing system 92 and the destination computing system 94 may be any personal computer, portable computer, content server, a network PC, a personal digital assistant (PDA), a cellular telephone or any other computing device that is capable of performing the functions as described in examples of the present disclosure.

As illustrated in FIG. 6, the programming may be processor executable instructions stored on non-transitory, tangible memory media and the hardware may include a processor for executing those instructions. In an example, the tangible memory media 100 and processor 102 may be implemented as examples of physical hardware 106 in the cloud 96. Each of the source and destination computing systems 92, 94 may also include respective processors 102', 102" and tangible memory media 100' and 100". In an example, the memory 100, 100', 100" stores program instructions that, when executed by processor 102, 102', 102", implement a program so as to implement examples of the XFTP file transfer protocol as disclosed herein.

It is to be understood that the memory 100, 100', 100" may be integrated in the same respective device as the processor 102, 102', 102", or it may be separate from, but accessible to the respective computing system 92, 94, 96.

In an example, the program instructions may be part of an installation package that can be executed by the processor 102', 102" to implement examples of the XFTP file transfer protocol. In these instances, the memory 100', 100" may be a portable medium, such as a compact disc (CD), a digital video disc (DVD), or a flash drive; or the memory 100', 100" may be a memory maintained by a server from which the installation package can be downloaded and installed on the respective computing systems 92, 94. In another example, the program instructions may be part of an application or applications already installed on the respective computing systems 92, 94. In this other example, the memory 100', 100" may include integrated memory, such as a hard drive.

As used herein, the cloud computing system 96 refers to a computing system including multiple pieces of hardware operatively coupled over a network so that they can perform a specific computing task. The cloud 96 may include a combination of physical hardware 106, software 108, and virtual hardware 110. The cloud computing system 96 is configured to (i) receive requests from the computing system 92, 94 (or from users using the computing system 92, 94), and (ii) return request responses. As examples, the cloud computing system 96 may be a private cloud, a public cloud or a hybrid cloud. Further, the cloud 96 may be a combination cloud computing system including a private cloud (or multiple private clouds) and a public cloud (or multiple public clouds).

The physical hardware 106 may include, among others, processors, memory devices, and networking equipment. The virtual hardware 110 is a type of software that is processed by the physical hardware 106 and designed to emulate specific hardware. As an example, virtual hardware 110 may include a virtual machine (VM), i.e., a software implementation of a computer that supports execution of an application like a physical machine.

An application, as used herein, refers to a set of specific instructions executable by a computing system for facilitating carrying out a specific task. For example, an application may take the form of a web-based tool providing users with a specific functionality, e.g., file transfer. It will be understood that an application as used herein is not limited to a file transfer application, but refers to an application supporting performing a specific task using computing resources such as, among others, enterprise applications, accounting applications, multimedia related applications, or data storage applications. Software 108 is a set of instructions and data configured to cause virtual hardware 110 to execute an application. As such, the cloud computing system 96 can render a particular application available to users associated with either of the respective computing systems 92, 94.

Executing an application in the cloud 96 may involve receiving a number of requests, processing the requests according to the particular functionality implemented by the application, and returning request responses to the requesting computing system 94. For executing the application, the resources (e.g., physical hardware 106, virtual hardware 110, and software 108) of the cloud computing system 96 may be scaled depending on the demands posed on the application. For example, cloud 96 may vary the size of the resources allocated to the application depending on the number of requests, the number of users interacting with the application, or requirement on the performance of the application (e.g., a maximum response time). While not shown, it is to be understood that the cloud 96 may also include an interface that allows the computing devices 92, 94 to communicate with the components of the cloud 96.

Referring still to FIG. 6, the physical hardware 106 of the cloud computing system 96 may include processor 102 and memory 100. The processor 102 may be any processor that is capable of executing program instructions stored in the memory 100 to implement, for example, a file transfer program 104 so as to implement examples of the XFTP file transfer protocol as disclosed herein. The memory 100 may include an operating system and applications, such as an XFTP file transfer application. The operating system may be a collection of programs that, when executed by the processor 102, serves as a platform on which the XFTP file transfer application can run. Some examples of operating systems include various versions of Linux® and Microsoft Windows®.

In the cloud computing system 96 of FIG. 6, the file transfer program 104 may have the hardware portions implemented as the processor 102 and may have the programming portions implemented as the operating system and applications.

The figures set forth herein aid in depicting various architectures, functionalities, and operations of the examples disclosed herein. Throughout the description, many of the components are defined, at least in part, as programs, programming, or program instructions. Each of these components, portions thereof, or various combinations thereof may represent in whole or in part a module, segment, or portion of code that includes one or more executable instructions to implement any specified logical function(s). Each component or various combinations thereof may represent a circuit or a number of interconnected circuits to implement the specified logical function(s).

The examples disclosed herein may be realized in any non-transitory, tangible computer-readable media for use by or in connection with an instruction execution system (e.g., computing systems 92, 94, 96), such as a computer/processor based system, or an ASIC (Application Specific Integrated Circuit), or another system that can fetch or obtain the logic from computer-readable media and execute the instructions contained therein. Non-transitory, tangible computer-readable media may be any media that is capable of containing, storing, or maintaining programs and data for use by or in connection with the computing systems 92, 94, 96. Computer readable media may include any one of many physical media such as, for example, electronic, magnetic, optical, electromagnetic, or semiconductor media. More specific examples of suitable computer-readable media include a portable magnetic computer diskette such as floppy diskettes or hard drives, a random access memory (RAM), a read-only memory (ROM), an erasable programmable read-only memory (EPROM), or a portable CD, DVD, or flash drive.

It is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A non-transitory, tangible, machine readable storage medium storing instructions that, when executed by a processor, cause the processor to:
   receive a source file, the source file being a binary file;
   portion the source file into multiple parts, wherein each of the multiple parts includes binary data;
   for each of the multiple parts, create an XML document containing a reference to the binary data; and
   transfer the multiple parts to a destination node through a single port, wherein to transfer each of the multiple parts to the destination node, the processor is to:
  determine whether a communication channel connected to the port supports Message Transmission Optimization Mechanism (MTOM);
  in response to a determination that the communication channel supports MTOM, transmit each of the multiple parts and the respective XML document to the destination node through the communication channel, and
  in response to a determination that the communication channel does not support MTOM, replace the reference to the binary data in each of the XML documents with an encoded representation of the binary data, and transmit each of the XML documents to the destination node through the communication channel without attachments, and
wherein the multiple parts are reassembled at the destination node into a copy of the source file by a reassembly engine.

2. The non-transitory, tangible, machine readable storage medium as defined in claim 1, wherein the multiple binary-data parts are transferred to the destination node using connectivity rules, delivery confirmation, ordering management, duplicate messaging protection, or a combination thereof.

3. The non-transitory, tangible, machine readable storage medium as defined in claim 1, wherein the instructions are to cause the processor to encode the binary data of each of the multiple parts in XML by (i) storing the binary data in a container and referencing the binary data in XML, or by (ii) using Base 64 encoding.

4. The non-transitory, tangible, machine readable storage medium as defined in claim 1, wherein the instructions are to cause the processor to add a security protocol layer to each of the multiple binary-data parts.

5. A method for transferring binary files across web service channels using XML, the method comprising:
  receiving a source file by a gateway engine, the source file being a binary file;
  portioning the source file into multiple parts by a breakdown engine, wherein each of the multiple parts includes binary data;
  for each of the multiple parts, creating an XML document containing a reference to the binary data;
  transferring the multiple parts by a reliable transfer engine to a destination node using a single port according to a messaging protocol,
  wherein transferring each of the multiple parts to the destination node includes:
    determining whether a communication channel connected to the port supports Message Transmission Optimization Mechanism (MTOM);
    in response to a determination that the communication channel supports MTOM, transmitting each of the multiple parts and the respective XML document to the destination node through the communication channel,
    in response to a determination that the communication channel does not support MTOM, replacing the reference to the binary data in each of the XML documents with an encoded representation of the binary data, and transmit each of the XML documents to the destination node through the communication channel without attachments, and reassembling the multiple parts into a copy of the source file by a reassembly engine.

6. The method as defined in claim 5 wherein the reliable transfer engine includes connectivity rules, delivery confirmation, ordering management, duplicate messaging protection, or a combination thereof.

7. The method as defined in claim 5, wherein the method further comprises encoding, by an encoder, binary data of each of the multiple parts in XML by (i) storing the binary data in a container and referencing the binary data in XML, or by (ii) using Base 64 encoding.

8. The method as defined in claim 5, further comprising adding a security protocol layer to each of the multiple parts.

9. A system for transferring files using XML, comprising:
  a processor; and
  a non-transitory, tangible memory device storing instructions that when executed by the processor cause the processor to:
    receive a source file, the source file being a binary file;
    parse the source file in multiple parts, each of the multiple parts containing binary data;
    for each of the multiple parts, create an XML document containing a reference to the binary data; and
    transmit the multiple parts to a destination node using a single port,
  wherein to transmit each of the multiple parts to the destination node, the processor is to:
    determine whether a communication channel connected to the port supports Message Transmission Optimization Mechanism (MTOM);
    in response to a determination that the communication channel supports MTOM, transmit each of the multiple parts and the respective XML document to the destination node through the communication channel, and
    in response to a determination that the communication channel does not support MTOM, replace the reference to the binary data in each of the XML documents with an encoded representation of the binary data, and transmit each of the XML documents to the destination node through the communication channel without attachments.

10. The system as defined in claim 9 wherein the transfer engine further includes: a Reliable Messaging (RM) Source to assign a message number to each of the multiple parts beginning at 1 and increasing by 1 for each subsequent part, the message numbers assigned in the same order in which the multiple parts are sent to the destination node.

11. The system as defined in claim 10, wherein the RM Source retransmits a message not acknowledged by a RM Destination.

12. The system as defined in claim 9, wherein the destination node includes a reassembly engine to reconstitute the multiple parts into a copy of the source file.

13. The system as defined in claim 9, wherein the processor is to encode the binary data in XML by (i) storing the binary data in a container and referencing the binary data in XML, or by (ii) using Base 64 encoding.

14. The system as defined in claim 9, wherein the instructions are to cause the processor to: and wherein the
  embed each of the XML documents in a SOAP message; and
  stream the SOAP message and referenced binary data as a multi-part MIME to the destination node.

15. The system as defined in claim 9, wherein the processor is to create the XML document for each of the multiple parts using XML-binary Optimized Packaging (XOP) protocol.

* * * * *